US012147909B2

(12) United States Patent
Lin et al.

(10) Patent No.: US 12,147,909 B2
(45) Date of Patent: Nov. 19, 2024

(54) CROSS-MEDIA CORRESPONDING KNOWLEDGE GENERATION METHOD AND APPARATUS

(71) Applicant: ZHEJIANG LAB, Zhejiang (CN)

(72) Inventors: Feng Lin, Hangzhou (CN); Yunhe Pan, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/491,817

(22) Filed: Oct. 23, 2023

(65) Prior Publication Data

US 2024/0046122 A1 Feb. 8, 2024

Related U.S. Application Data

(63) Continuation of application No. PCT/CN2022/099376, filed on Jun. 17, 2022.

(51) Int. Cl.
| | |
|---|---|
| *G06N 5/022* | (2023.01) |
| *G06F 40/30* | (2020.01) |
| *G06V 10/77* | (2022.01) |
| *G06V 10/80* | (2022.01) |
| *G06V 40/20* | (2022.01) |

(52) U.S. Cl.
CPC ............ *G06N 5/022* (2013.01); *G06F 40/30* (2020.01); *G06V 10/7715* (2022.01); *G06V 10/806* (2022.01); *G06V 40/25* (2022.01)

(58) Field of Classification Search
CPC ...... G06N 5/022; G06F 40/30; G06V 10/806; G06V 10/7715; G06V 40/25
See application file for complete search history.

(56) References Cited

U.S. PATENT DOCUMENTS

2012/0124029 A1 5/2012 Kant

FOREIGN PATENT DOCUMENTS

| CN | 111680173 A | 9/2020 |
|---|---|---|
| CN | 112052689 A | 12/2020 |
| WO | 2017210949 A1 | 12/2017 |

OTHER PUBLICATIONS

International Search Report (PCT/CN2022/099376); Date of Mailing: Jan. 5, 2023.

*Primary Examiner* — Casey R. Garner
(74) *Attorney, Agent, or Firm* — W&G Law Group

(57) ABSTRACT

A method and an apparatus for cross-media corresponding knowledge generation. The method comprises: generating a second knowledge unit of a second medium according to a first knowledge unit of a predefined first medium; generating a first feature parameter vector corresponding to the first knowledge unit and a second feature parameter vector corresponding to the second knowledge unit; mapping the first feature parameter vector and the second feature parameter vector to a corresponding two-dimensional spherical feature surface to obtain a first feature point of the first feature parameter vector on the corresponding two-dimensional spherical feature surface and a second feature point of the second feature parameter vector on the corresponding two-dimensional spherical feature surface; indexing the first feature point and the second feature point to obtain a first index and a second index; and generating a bidirectional index corresponding relationship between the first knowledge unit and the second knowledge unit.

15 Claims, 4 Drawing Sheets

```
┌─────────────────────────────────────────────────────────────┐
│ Generating a second knowledge unit of a second medium       │── S101
│ according to a first knowledge unit of a predefined first   │
│ medium, wherein types of the first medium and the second    │
│ medium are different from each other, and the first         │
│ knowledge unit and the second knowledge unit are            │
│ respectively configured to represent semantics of feature   │
│ information of the same target object in the corresponding  │
│ types of media                                              │
└─────────────────────────────────────────────────────────────┘
                              │
                              ▼
┌─────────────────────────────────────────────────────────────┐
│ Generating a first feature parameter vector corresponding   │── S102
│ to the first knowledge unit and a second feature parameter  │
│ vector corresponding to the second knowledge unit           │
└─────────────────────────────────────────────────────────────┘
                              │
                              ▼
┌─────────────────────────────────────────────────────────────┐
│ Mapping the first feature parameter vector and the second   │── S103
│ feature parameter vector respectively to a corresponding    │
│ two-dimensional spherical feature surface according to a    │
│ preset mapping relationship to obtain a first feature point │
│ of the first feature parameter vector on the corresponding  │
│ two-dimensional spherical feature surface and a second      │
│ feature point of the second feature parameter vector on the │
│ corresponding two-dimensional spherical feature surface     │
└─────────────────────────────────────────────────────────────┘
                              │
                              ▼
┌─────────────────────────────────────────────────────────────┐
│ Indexing the first feature point and the second feature     │── S104
│ point respectively to obtain a first index corresponding    │
│ to the first feature point and a second index               │
│ corresponding to the second feature point                   │
└─────────────────────────────────────────────────────────────┘
                              │
                              ▼
┌─────────────────────────────────────────────────────────────┐
│ Generating a bidirectional index corresponding relationship │── S105
│ between the first knowledge unit and the second knowledge   │
│ unit according to the first index and the second index      │
└─────────────────────────────────────────────────────────────┘
```

FIG. 1

CROSS-MEDIA CORRESPONDING KNOWLEDGE GENERATION METHOD AND APPARATUS

CROSS-REFERENCE TO RELATED APPLICATIONS

The present application is a continuation of International Application No. PCT/CN2022/099376, filed on Jun. 17, 2022, the content of which is incorporated herein by reference in its entirety.

TECHNICAL FIELD

The present disclosure relates to the field of artificial intelligence, and in particular to a method and an apparatus for cross-media corresponding knowledge generation.

BACKGROUND

Cross-media knowledge representation is to numerically convert semantic information contained in cross-media data into real value vectors, mainly including joint representations and coordinated representations. The joint representations map information of a plurality of media together to a unified vector space. The coordinated representations are responsible for mapping each of the plurality of media to respective representation space respectively, but the mapped vectors meet certain correlation constraints (such as linear correlation).

Cross-media knowledge mapping is to map information in a piece of specific medium data to another medium. Cross-media knowledge alignment is to identify corresponding relationships of components and elements between different media. Cross-media fusion is to combine the information of the plurality of media for target prediction (classification or regression). Cross-media coordinated learning is to transfer knowledge learnt on media with rich information to media with scarce information, enabling the learning of various media to complement each other.

At present, knowledge representation between cross media is realized through a model training method, which requires a large number of training samples and has low processing efficiency and limited accuracy.

SUMMARY

The present disclosure provides a cross-media corresponding knowledge generation method and apparatus.

A first aspect of an embodiment of the present disclosure provides a cross-media corresponding knowledge generation method, including:
  generating a second knowledge unit of a second medium according to a first knowledge unit of a predefined first medium, wherein types of the first medium and the second medium are different, and the first knowledge unit and the second knowledge unit are respectively configured to represent semantics of feature information of the same target object in the corresponding types of media;
  generating a first feature parameter vector corresponding to the first knowledge unit and a second feature parameter vector corresponding to the second knowledge unit;
  mapping the first feature parameter vector and the second feature parameter vector to a corresponding two-dimensional spherical feature surface respectively according to a preset mapping relationship, so as to obtain a first feature point of the first feature parameter vector on the corresponding two-dimensional spherical feature surface and a second feature point of the second feature parameter vector on the corresponding two-dimensional spherical feature surface;
  indexing the first feature point and the second feature point respectively to obtain a first index corresponding to the first feature point and a second index corresponding to the second feature point; and
  generating a bidirectional index corresponding relationship between the first knowledge unit and the second knowledge unit according to the first index and the second index.

A second aspect of an embodiment of the present disclosure provides a multi-media corresponding knowledge generation apparatus, including a memory and one or more processors, wherein the memory stores an executable code, and the one or more processors, when executing the executable code, are configured to implement the multi-media corresponding knowledge generation method described in the first aspect.

A third aspect of an embodiment of the present disclosure provides a computer readable storage medium, storing a program, and the program, when executed by a processor, implements the cross-media corresponding knowledge generation method described in the second aspect.

The present disclosure has the beneficial effects: the first knowledge unit of the first medium and the second knowledge unit of the corresponding second medium are mapped to the corresponding two-dimensional spherical feature surface respectively to obtain the first feature point of the first knowledge unit on the corresponding two-dimensional spherical feature surface and the second feature point of the second knowledge unit on the corresponding two-dimensional spherical feature surface, then the corresponding first feature point and the second feature point are respectively indexed to establish the bidirectional index corresponding relationship between the first knowledge unit and the second knowledge unit, representation of cross-media corresponding knowledge of the first knowledge unit and the second knowledge unit is realized, the representation of the cross-media corresponding knowledge has high realizing efficiency and high accuracy, the bidirectional index corresponding relationship can realize mutual mapping between cross-media knowledge units, and the bidirectional index corresponding relationship is convenient for subsequent direct use.

BRIEF DESCRIPTION OF DRAWINGS

FIG. 1 is a schematic flowchart of a cross-media corresponding knowledge generation method in an embodiment of the present disclosure.

DESCRIPTION OF EMBODIMENTS

Figure 2:
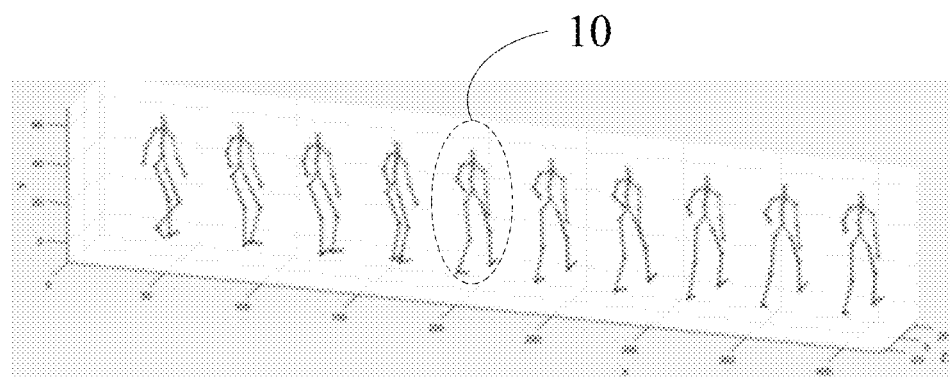
FIG. 2 is a schematic diagram of a plurality of first knowledge units of a first medium in an embodiment of the present disclosure.

Technical solutions in embodiments of the present disclosure will be clearly and completely described in conjunction with accompanying drawings in the embodiments of the present disclosure below.

In a cross-media corresponding knowledge generation method provided by an embodiment of the present disclosure, a first knowledge unit of a first medium and a second knowledge unit of a corresponding second medium are mapped to a corresponding two-dimensional spherical feature surface respectively to obtain a first feature point of the first knowledge unit on the corresponding two-dimensional spherical feature surface and a second feature point of the second knowledge unit on the corresponding two-dimensional spherical feature surface, then the corresponding first feature point and the second feature point are respectively indexed to establish a bidirectional index corresponding relationship between the first knowledge unit and the second knowledge unit, representation of cross-media corresponding knowledge of the first knowledge unit and the second knowledge unit is realized, the representation of the cross-media corresponding knowledge has high realizing efficiency and high accuracy, the bidirectional index corresponding relationship can realize mutual mapping between cross-media knowledge units, and the bidirectional index corresponding relationship is convenient for subsequent direct use.

An executive body of the cross-media corresponding knowledge generation method of an embodiment of the present disclosure may be any device with data processing capabilities, which may be a computer and the like. Referring to FIG. 1, the cross-media corresponding knowledge generation method of an embodiment of the present disclosure may include steps S101-S105.

Specifically, in step S101, a second knowledge unit of a second medium is generated according to a first knowledge unit of a predefined first medium, wherein types of the first medium and the second medium are different, and the first knowledge unit and the second knowledge unit are respectively configured to represent semantics of feature information of the same target object in the corresponding types of media.

The cross-media corresponding knowledge generation method of an embodiment of the present disclosure may be applied to machine translation, for example, the first medium is a language A, and the second medium is a language B; and for another example, the first medium is lip reading, and the second medium is speech.

The cross-media corresponding knowledge generation method of an embodiment of the present disclosure may be applied to media streaming content description, for example, the first medium is an image or video, the second medium is textual description, and the content of the image or video is expressed by the textual description.

The cross-media corresponding knowledge generation method of an embodiment of the present disclosure may be applied to speech synthesis, for example, the first medium is text information, and the second medium is a speech signal.

A target object in an embodiment of the present disclosure may be a user, an animal, text or others.

Figure 3:
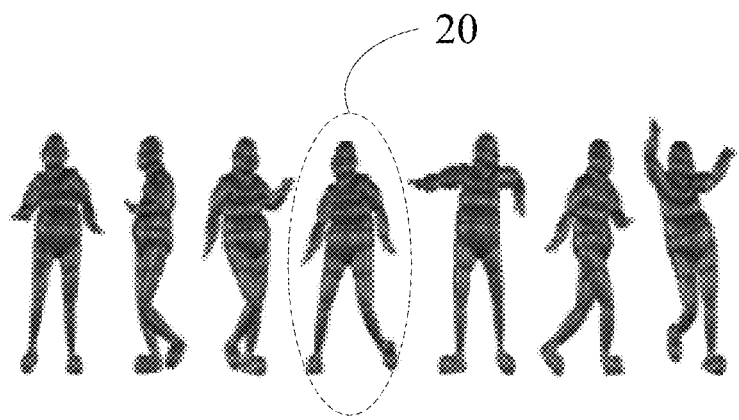
FIG. 3 is a schematic diagram of a plurality of second knowledge units of a first medium in an embodiment of the present disclosure.

For example, in an exemplary embodiment, the target object is the user, feature information is a user behavior posture, the first knowledge unit and the second knowledge unit are respectively configured to represent semantics of the user behavior posture, the first medium is a user behavior posture video, and the second medium is a finite element model. Referring to FIG. 2 and FIG. 3, the first knowledge unit may be a video 10 of "right leg forward walking", the second knowledge unit is a finite element model 20 of "right leg forward walking", and the video 10 of "right leg forward walking" corresponds to the finite element model 20 of "right leg forward walking".

In other embodiments, the target object is the text, the semantics of the feature information may be text content, the first knowledge unit and the second knowledge unit are respectively configured to represent the text content, the first medium is the text information, and the second medium is the speech signal.

During implementation of step S101, specifically, the second knowledge unit of the second medium is generated by adopting an automatic machine or other algorithms according to the first knowledge unit of the first medium.

In step S101, a plurality of first knowledge units may be included, the plurality of first knowledge units correspondingly represent semantics of different feature information of the same target object, and as shown in FIG. 2, the first knowledge units include different user behavior posture videos. The second knowledge units are in one-to-one correspondence with the first knowledge units, and the corresponding first knowledge unit and second knowledge unit represent the same meanings.

In some embodiments, before generating the second knowledge unit of the second medium according to the first knowledge unit of the predefined first medium, the first knowledge unit of the first medium is defined according to manual or automatic text generation.

In step S102, a first feature parameter vector corresponding to the first knowledge unit and a second feature parameter vector corresponding to the second knowledge unit are generated.

Types of the first feature parameter vector and the second feature parameter vector may be selected according to needs, optionally, the first feature parameter vector is a feature parameter vector in a BVH format, and/or the second feature parameter vector is a differential parameter vector of a boundary point. For example, in some embodiments, referring to FIG. 4, the first feature parameter vector is a feature parameter vector 30 in the BVH format, and the second feature parameter vector is a differential parameter vector 40 of the boundary point. It should be understood that the types of the first feature parameter vector and the second feature parameter vector may also be others.

The first feature parameter vector and the second feature parameter vector both include a plurality of feature parameters, wherein a number of the feature parameters in the first feature parameter vector and a number of the feature parameters in the second feature parameter vector may be the same or different. For example, in some embodiments, the first feature parameter vector includes 1000 feature parameters, and the second feature parameter vector includes 200 feature parameters.

Following the embodiments shown in FIG. 2 and FIG. 3, the feature parameters in the first feature parameter vector may include positions, included angles, position change speeds, acceleration and the like of 36 bones of a user, and the feature parameters in the second feature parameter vector may include positions, acceleration, speeds and other boundary feature parameters of the boundary point on a contour of the user.

During implementation of step S102, specifically, the first feature parameter vector corresponding to the first knowledge unit is generated by using an automatic machine or other algorithms according to the first knowledge unit; and moreover, the second feature parameter vector corresponding to the second knowledge unit is generated by using computer graphics rendering or other algorithms according to the second knowledge unit.

In an exemplary embodiment, a plurality of first knowledge units are included, the plurality of first knowledge units correspondingly represent semantics of different feature information of the same target object, and the second knowledge units are in one-to-one correspondence with the first knowledge units. During implementation of step S102, specifically, the first feature parameter vectors corresponding to all first knowledge units respectively and the second feature parameter vectors corresponding to all second knowledge units respectively are generated.

In step S103, the first feature parameter vector and the second feature parameter vector are respectively mapped to a corresponding two-dimensional spherical feature surface according to a preset mapping relationship to obtain a first feature point of the first feature parameter vector on the corresponding two-dimensional spherical feature surface and a second feature point of the second feature parameter vector on the corresponding two-dimensional spherical feature surface.

In an embodiment of the present disclosure, position information of a first position of the first feature parameter vector mapped to a first two-dimensional spherical feature surface is determined according to the preset mapping relationship to obtain the first feature point, so that the first feature parameter vector is mapped to the first two-dimensional spherical feature surface; and moreover, position information of a second position of the second feature parameter vector mapped to a second two-dimensional spherical feature surface is determined according to the preset mapping relationship to obtain the second feature point, so that the second feature parameter vector is mapped to the second two-dimensional spherical feature surface. It should be understood that the first position on the first two-dimensional spherical feature surface corresponds to the first feature point, and the first feature point corresponds to the first feature parameter vector; and the second position on the second two-dimensional spherical feature surface corresponds to the second feature point, and the second feature point corresponds to the second feature parameter vector. In some embodiments, the position information of the first position and the position information of the second position are represented through longitudes and dimensions; and in some other embodiments, the position information of the first position and the position information of the second position are represented through zenith angles and azimuth angles.

Positions of feature points of different first feature parameter vectors mapped to the corresponding two-dimensional spherical feature surface are different, and positions of feature points of different second feature parameter vectors mapped to the corresponding two-dimensional spherical feature surface are also different.

Figure 4:
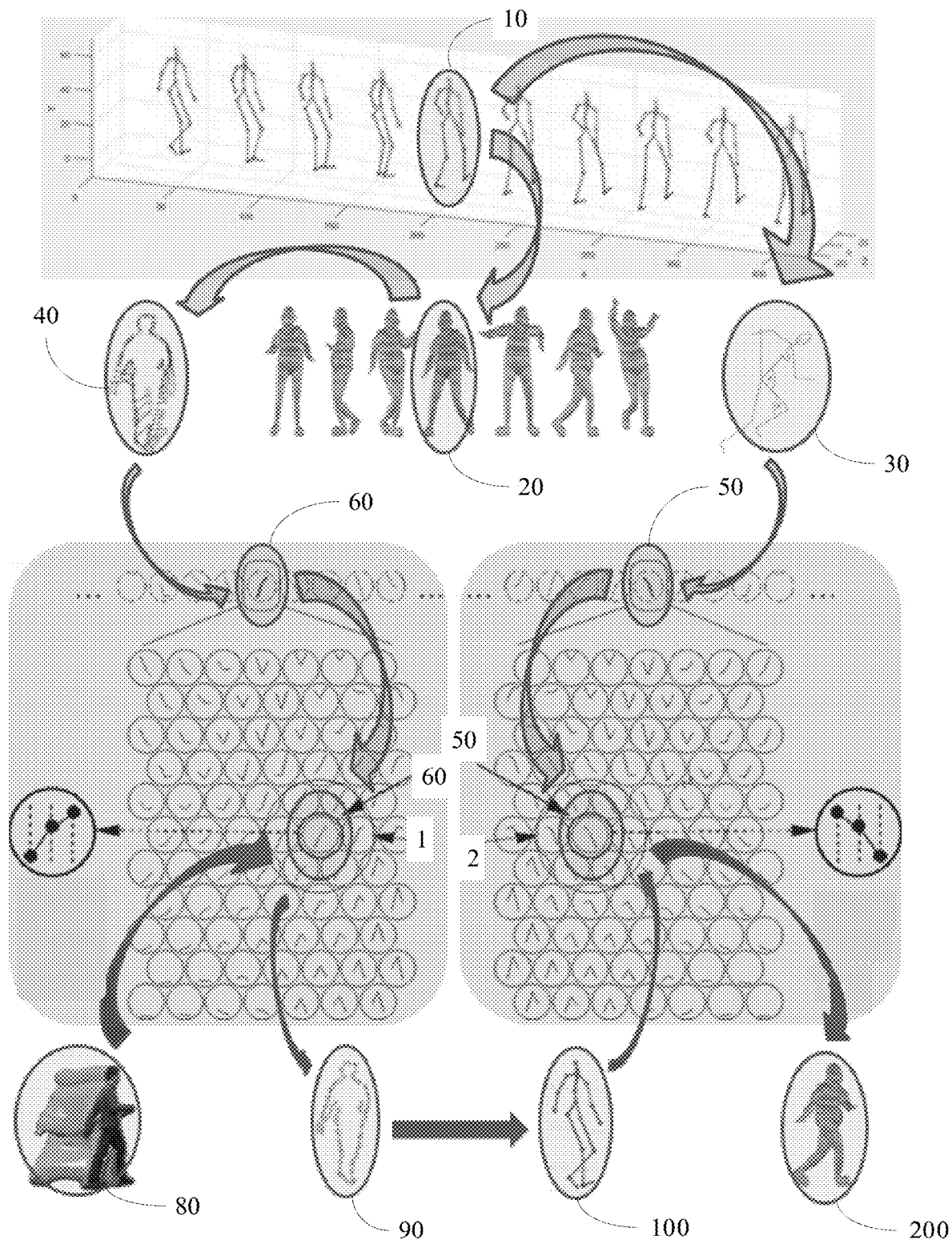
FIG. 4 is a schematic diagram of a specific implementation process of a cross-media corresponding knowledge generation method in an embodiment of the present disclosure.

Referring to FIG. 4, in an embodiment of the present disclosure, the first feature point 50 and the second feature point 60 may be represented by a circle, and a center of the circle is the position information of the corresponding feature point on the corresponding two-dimensional spherical feature surface.

It needs to be noted that, in an embodiment of the present disclosure, on the same two-dimensional spherical feature surface, each feature point is taken as a center to form a feature domain of the feature point, as shown in FIG. 4, other first feature points in the feature domain 2 to which the first feature point 50 belongs surround the first feature point 50, and positions of other first feature points in the feature domain 2 are all adjacent to the first feature point 50. Other second feature points in the feature domain 1 to which the second feature point 60 belongs surround the second feature point 60, and positions of other second feature points in the feature domain 1 are all adjacent to the second feature point 60.

In step S104, the first feature point and the second feature point are respectively indexed to obtain a first index corresponding to the first feature point and a second index corresponding to the second feature point.

In this step, the first feature point X is indexed to obtain the first index IX corresponding to the first feature point X, the first index IX is used for representing the first feature point X and the first feature parameter vector $(x_1, x_2, \ldots, x_{m1})$ corresponding to the first feature point X. Similarly, the second feature point Y is indexed to obtain the second index IY corresponding to the second feature point Y, and the second index IY is used for representing the second feature point Y and the second feature parameter vector $(y_1, y_2, y_{m2})$ corresponding to the second feature point Y.

After step S103, and before step S104, the cross-media corresponding knowledge generation method of an embodiment of the present disclosure may further include the following steps:

(1) For each first feature point, the first feature point is taken as a first central feature point, and a first feature parameter vector of the first central feature point is updated according to the first feature parameter vectors of the first feature points around the first central feature point.

(2) For each second feature point, the second feature point is taken as a second central feature point, and a second feature parameter vector of the second central feature point is updated according to the second feature parameter vectors of the second feature points around the second central feature point.

It needs to be noted that, step (1) and step (2) may be executed sequentially or synchronously, but both need to establish mutual indexes of these two central feature points.

In step S104, when the first feature point and the second feature point are respectively indexed to obtain the first index corresponding to the first feature point and the second index corresponding to the second feature point, specifically, the first feature points after updating feature parameter vectors and the second feature points after updating feature parameter vectors are indexed respectively to obtain first indexes corresponding to the first feature points after updating the feature parameter vectors and second indexes corresponding to the second feature points after updating the feature parameter vectors.

In an embodiment of the present disclosure, updating the first feature parameter vector of the first central feature point is to associate different first feature points, so as to associate a plurality of first knowledge units to improve the accuracy of subsequent cross-media mapping. Updating the second feature parameter vector of the second central feature point is to associate different second feature points, so as to associate a plurality of second knowledge units to improve the accuracy of subsequent cross-media mapping.

The first feature parameter vector of the first central feature point may be updated by adopting different modes, for example, the first feature parameter vector of the first central feature center is updated through influence of the first feature points around the first central feature point on the feature parameters of the first central feature point; and for another example, the first feature parameter vector of the first central feature point is adjusted according to experience. It needs to be noted that, in an embodiment of the present disclosure, updating the first feature parameter vector may include, but is not limited to: updating numerical values of at least part of feature parameters in the first feature parameter vector. For example, in some embodiments, when the first feature parameter vector of the first central feature point is updated according to the first feature parameter vectors of the first feature points around the first central feature point, specifically, a first weight of each first feature point among the first feature points around the first central feature point is determined first; and the first feature parameter vector of the first central feature point is determined again according to the first weights, the first feature parameter vectors of the first feature points corresponding to the first weights and the first feature parameter vector of the first central feature point. In this embodiment, the first feature parameter vector of the first central feature point is updated through the influence of the first feature points around the first central feature point on the feature parameters of the first central feature point, different first feature points are accurately associated by adopting this mode, so that a plurality of first knowledge units are associated more accurately, and the accuracy of subsequent cross-media mapping is improved.

Exemplarily, the first weight of an $I^{th}$ first feature point Xi around the first central feature point X is $w_i$, and a formula for updating the first central feature point X is as follows:

$$X'_i = w_i X + (1-w_i) X_i \quad (1);$$

in formula (1), $X'_i$ is a new first feature parameter vector of the first central feature point obtained after the first feature parameter vector of the first central feature point X is updated based on the first feature point Xi;

X is the first feature parameter vector of the first central feature point X; and $X_i$ is the first feature parameter vector of the $i^{th}$ first feature point Xi around the first central feature point X.

When there are a plurality of first feature points around the first central feature point, in some embodiments, the first central feature point X may be sequentially updated according to the first feature points around the first central feature point from far to near or from near to far in first distances. In some other embodiments, after updating the first central feature point respectively through each first feature point among the first feature points around the first central feature point, a plurality of first feature parameter vectors of the first central feature point obtained by updating are weighted to obtain the final first feature parameter vector of the first central feature point.

The first weights are negatively correlated with the first distances, and the first distances are distances from the first central feature point to the corresponding first feature points around the first central feature point. That is, the further the distance to the first central feature point and the smaller the first weights corresponding to the first feature points around the first central feature point, the smaller the influence on the first feature parameter vector of the first central feature point; and the closer the distance to the first central feature point and the greater the first weights corresponding to the first feature points around the first central feature point, the greater the influence on the first feature parameter vector of the first central feature point.

Furthermore, the first weights may be determined in different ways, for example, in some embodiments, the first weights are determined based on a Gauss equation and the first distances. Exemplarily, the corresponding first feature points around the first central feature point include A, B, and C, the first weights corresponding to A, B, and C respectively are determined respectively based on the Gauss equation and the corresponding first distances.

In some other embodiments, the first weights are set based on experience.

The determination of the first feature points around the first central feature point may include a plurality of methods. For example, in some embodiments, the first feature points around the first central feature point and the first central feature point are located in the same feature domain, the feature domain takes the first central feature point as a center, the first feature points around the first central feature point surround the first central feature point, and the first feature points around the first central feature point are adjacent to a position of the first central feature point. As shown in FIG. 4, the feature domain 2 includes the first feature point 50 and 6 other first feature points surrounding the first feature point 50, and the first feature point 50 is the first central feature point in the feature domain 2.

In some other embodiments, the first feature points around the first central feature point include: first feature points in which a modulus of a difference between the first feature parameter vectors and the first feature parameter vectors corresponding to the first feature points after updating the feature parameter vectors is smaller than a first preset threshold among the first feature points other than the first central feature point. The first feature points around the first central feature point meet:

$$|X'_i - X_i| < a \quad (2).$$

In formula (2), a represents the first preset threshold, and a magnitude of a may be set according to requirements. It should be understood that a is associated with the first weights, for example, among the first feature points other than the first central feature point, the first feature points with the first weights greater than or equal to 0.6 have influence on the first feature parameter vector of the first central feature point, the first feature points with the first weights smaller than 0.6 do not have influence on the first feature parameter vector of the first central feature point, and then the magnitude of a is a modulus of a difference between the first feature parameter vector corresponding to the first feature point with the first weight being 0.6 and the first feature parameter vectors corresponding to the first feature points after updating the feature parameter vectors among the first feature points other than the first central feature point. It needs to be noted that, the first feature parameter vectors corresponding to the first feature points after updating the feature parameter vectors here are obtained by updating the first feature points based on the first feature point with the first weight being 0.6.

The second feature parameter vector of the second central feature point may be updated by adopting different modes, for example, the second feature parameter vector of the second central feature center is updated through influence of the second feature points around the second central feature point on the feature parameters of the second central feature point; and for another example, the second feature parameter vector of the second central feature point is adjusted according to experience. It needs to be noted that, in an embodiment of the present disclosure, updating the second feature parameter vector may include, but is not limited to: updating numerical values of at least part of feature parameters in the second feature parameter vector.

For example, in some embodiments, when the second feature parameter vector of the second central feature point is updated according to the second feature parameter vectors of the second feature points around the second central feature point, specifically, a second weight of each second feature point among the second feature points around the second central feature point is determined first; and the second feature parameter vector of the second central feature point is determined again according to the second weights, the second feature parameter vectors of the second feature points corresponding to the second weights and the second feature parameter vector of the second central feature point. In this embodiment, the second feature parameter vector of the second central feature point is updated through the influence of the second feature points around the second central feature point on the feature parameters of the second central feature point, different second feature points are accurately associated by adopting this mode, so that a plurality of second knowledge units are associated more accurately, and the accuracy of subsequent cross-media mapping is improved.

Exemplarily, the second weight of an second feature point Yi around the second central feature point Y is $v_i$, and a formula for updating the second central feature point Y is as follows:

$$Y'_i = v_i Y + (1-v_i) Y \qquad (3);$$

In formula (3), represents a new second feature parameter vector of the second central feature point obtained after the second feature parameter vector of the second central feature point Y is updated based on the second feature point Yi.

Y is the second feature parameter vector of the second central feature point Y.

$Y_i$ represents the second feature parameter vector of the $i^{th}$ second feature point Yi around the second central feature point Y.

When there are a plurality of second feature points around the second central feature point, in some embodiments, the second central feature point Y may be sequentially updated according to the second feature points around the second central feature point from far to near or from near to far in second distances. In some other embodiments, after updating the second central feature point respectively through each second feature point among the second feature points around the second central feature point, a plurality of second feature parameter vectors of the second central feature point obtained by updating are weighted to obtain the final second feature parameter vector of the second central feature point.

The second weights are negatively correlated with the second distances, and the second distances are distances from the second central feature point to the corresponding second feature points around the second central feature point. That is, the further the distance to the second central feature point and the smaller the second weights corresponding to the second feature points around the second central feature point, the smaller the influence on the second feature parameter vector of the second central feature point; and the closer the distance to the second central feature point and the greater the second weights corresponding to the second feature points around the second central feature point, the greater the influence on the second feature parameter vector of the second central feature point.

Furthermore, the second weights may be determined in different ways, for example, in some embodiments, the second weights are determined based on a Gauss equation and the second distances. Exemplarily, the corresponding second feature points around the second central feature point include D, E, and F, the second weights corresponding to D, E, and F respectively are determined respectively based on the Gauss equation and the corresponding second distances.

In some other embodiments, the second weights are set based on experience.

The determination of the second feature points around the second central feature point may include a plurality of methods. For example, in some embodiments, the second feature points around the second central feature point and the second central feature point are located in the same feature domain, the feature domain takes the second central feature point as a center, the second feature points around the second central feature point surround the second central feature point, and the second feature points around the second central feature point are adjacent to a position of the second central feature point. As shown in FIG. 4, the feature domain 1 includes the second feature point 60 and 6 other second feature points surrounding the second feature point 60, and the second feature point 60 is the second central feature point in the feature domain 1.

In some other embodiments, the second feature points around the second central feature point include: second feature points in which a modulus of a difference between the second feature parameter vectors and the second feature parameter vectors corresponding to the second feature points after updating the feature parameter vectors is smaller than a second preset threshold among the second feature points other than the second central feature point. The second feature points around the second central feature point meet:

$$|Y'_i - Y_i| < b \qquad (2)$$

In formula (2), b represents the second preset threshold, and a magnitude of b may be set according to needs. It should be understood that b is associated with the second weights, for example, among the second feature points other than the second central feature point, the second feature points with the second weights greater than or equal to 0.6 have influence on the second feature parameter vector of the second central feature point, the second feature points with the second weights smaller than 0.6 do not have influence on the second feature parameter vector of the second central feature point, and then the magnitude of a is a modulus of a difference between the second feature parameter vector corresponding to the second feature point with the second weight being 0.6 and the second feature parameter vectors corresponding to the second feature points after updating the feature parameter vectors among the second feature points other than the second central feature point. It needs to be noted that, the second feature parameter vectors corresponding to the second feature points after updating the feature parameter vectors here are obtained by updating the second feature points based on the second feature point with the second weight being 0.6.

The mode of updating the first feature parameter vector of the first central feature point and the mode of updating the second feature parameter vector of the second central feature point in the above embodiments may be combined.

In a feasible implementation, n first knowledge units are included, n second knowledge units are correspondingly included, and an updating process of the first feature points may include the following steps:

(11) The first feature parameter vectors corresponding to the first knowledge units generated in step S102 are reused to obtain first feature parameter vectors respectively corresponding to the n first knowledge units of a first medium, namely obtaining n first feature parameter vectors, such as a row of first feature parameter vectors shown in FIG. 4, and the first feature parameter vectors may be three-dimensional vectors (such as three-dimensional vectors led out by the first feature point 50 through a dashed arrow in FIG. 4).

(12) A next first feature parameter vector $X=(x_1, x_2, \ldots X_m)$ obtained in step (11) is mapped to a first two-dimensional spherical feature surface through a function, so as to generate a first feature point 50 (illustrated by a first feature parameter vector in a two-dimensional array in FIG. 4).

(13) The first feature point 50 mapped to the first two-dimensional spherical feature surface in step (12) is taken as a center, weight values $w_i$ of first feature parameter vectors Xi represented by other first feature points in the feature domain 2 to which the first feature point 50 belongs are calculated by a Gauss equation, and the first feature parameter vector of the first feature point 50 is updated to obtain $X'_i=w_iX+(1-w_i)X_i$.

(14) A first index IX of the first feature point 50 is recorded.

In this step, a recording mode may be a table, text and the like.

(15) The steps (11)-(14) are reused with the n first knowledge units of the first medium until $|X'_i-X_i|$ is smaller than the first preset threshold a.

An updating process of the second feature point may include the following steps:

(21) The second feature parameter vectors corresponding to the second knowledge units and generated in step S102 are reused to obtain second feature parameter vectors respectively corresponding to the n second knowledge units of a second medium, namely obtaining n second feature parameter vectors, such as a row of second feature parameter vectors shown in FIG. 4, and the second feature parameter vectors may be three-dimensional vectors (such as three-dimensional vectors led out by the second feature point 60 through a dashed arrow in FIG. 4).

(22) A next second feature parameter vector $Y=(y_1, y_2, y_{m2})$ obtained in step (11) is mapped to a second two-dimensional spherical feature surface through a function, so as to generate a second feature point 60 (illustrated by a second feature parameter vector in a two-dimensional array in FIG. 4).

(23) The second feature point 60 mapped to the second two-dimensional spherical feature surface in step (12) is taken as a center, weight values $v_i$ of second feature parameter vectors $Y_i$ represented by other second feature points in the feature domain 1 to which the second feature point 60 belongs are calculated by the Gauss equation, and the second feature parameter vector of the second feature point 60 is updated to obtain $Y'_i=v_iY+(1-v_i)Y$.

(24) A second index IY of the second feature point 60 is recorded.

In this step, a recording mode may be a table, text and the like.

(25) The steps (21) to (24) are reused with the n second knowledge units of the second medium until $|Y'_i-Y_i|$ is smaller than the second preset threshold b.

Therefore, mapping of the first feature parameter vectors of the first knowledge units of the first medium to the first two-dimensional spherical feature surface is completed, and the first feature points and the feature domain are evolved by self; and mapping of the second feature parameter vectors of the second knowledge units of the second medium to the second two-dimensional spherical feature surface is completed, and the second feature points and the feature domain are evolved by themselves.

In the step S105, a bidirectional index corresponding relationship between the first knowledge unit and the second knowledge unit is generated according to the first index and the second index.

Following the above embodiment, the bidirectional index corresponding relationship is: the first index IX of the first knowledge unit corresponding to the second index IY of the second knowledge unit corresponding to the first knowledge unit.

At this point, the first knowledge unit of the first medium and the second knowledge unit of the corresponding second medium are mapped to the corresponding two-dimensional spherical feature surface respectively to obtain the first feature point of the first knowledge unit on the corresponding two-dimensional spherical feature surface and the second feature point of the second knowledge unit on the corresponding two-dimensional spherical feature surface, then the corresponding first feature point and the second feature point are respectively indexed to establish the bidirectional index corresponding relationship between the first knowledge unit and the second knowledge unit, representation of cross-media corresponding knowledge of the first knowledge unit and the second knowledge unit is realized, the bidirectional index corresponding relationship can realize mutual mapping between cross-media knowledge units, and the bidirectional index corresponding relationship is convenient for subsequent direct use.

The above obtained directional index corresponding relationship may be applied to mapping of the cross-media corresponding knowledge, specifically, it is assumed that one piece of knowledge unit is expressed as the feature parameter vectors $X=(x_1, x_2, \ldots X_{m1})$, m=m1, and $Y=(y_1, y_2, Y_{m2})$, m=m2 in two media respectively, and m is the number of feature parameters contained in each feature parameter vector. The feature parameter vector X is given, and its cross-media corresponding feature parameter vector Y is automatically obtained based on the above bidirectional index corresponding relationship; vice versa.

Figure 5:
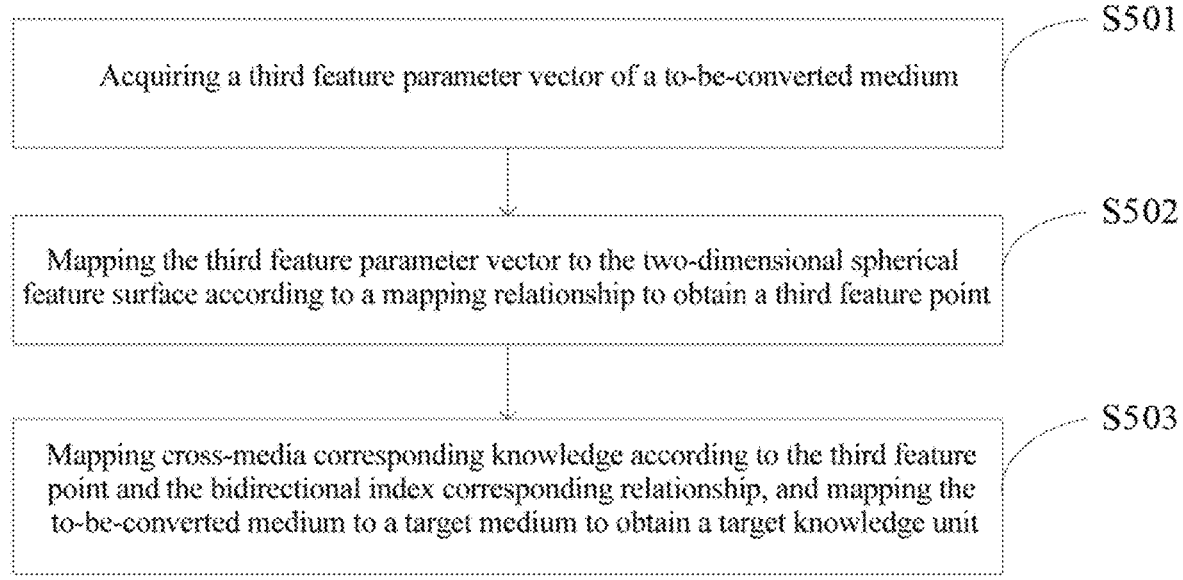
FIG. 5 is a specific schematic flowchart of a cross-media corresponding knowledge generation method in an embodiment of the present disclosure.

In some embodiments, referring to FIG. 5, after generating the directional index corresponding relationship between the first knowledge unit and the second knowledge unit according to the first index and the second index, the method further includes the following steps:

S501, a third feature parameter vector of a to-be-converted medium is acquired.

The third feature parameter vector may be determined by information of a to-be-transformed knowledge unit of a to-be-converted medium input by a user, and the information may be represented through images, or may also be videos, speech, text and the like. The third feature parameter vector 80 in FIG. 4 is determined according to an image or video indicating "right leg forward walking" and input by the user.

The third feature parameter vector $Y=(y_1, y_2, \ldots y_{m2})$.

S502, the third feature parameter vector is mapped to the two-dimensional spherical feature surface according to a mapping relationship to obtain a third feature point.

It may be understood that the mapping relationship in S502 is the mapping relationship in S103, and the implementation of S502 is similar to the mapping of the first feature parameter vector and the second feature parameter vector to the corresponding two-dimensional spherical feature surface in S103.

S503, cross-media corresponding knowledge is mapped according to the third feature point and the bidirectional index corresponding relationship, and the to-be-converted medium is mapped to a target medium to obtain a target knowledge unit.

The to-be-converted medium is one of the first medium and the second medium, and the target medium is the other one of the first medium and the second medium. Specifically, when the to-be-converted medium is the first medium, and the target medium is the second medium, the third feature parameter vector corresponds to a first knowledge unit, and the target knowledge unit is the second knowledge unit; and when the to-be-converted medium is the second medium, and the target medium is the first medium, the third feature parameter vector corresponds to a second knowledge unit, and the target knowledge unit is the first knowledge unit.

Exemplarily, when the to-be-converted medium is the second medium, and the target medium is the first medium, referring to FIG. 4, an implementation process of S503 may include the following steps:

(31) A second index of a second feature point matched with a position of the third feature point is determined.

In FIG. 4, the third feature parameter vector (the third feature parameter vector is used for indicating "right leg forward walking") is mapped to the second two-dimensional spherical surface, to obtain the second feature point 60 matched with the position of the third feature point, so as to obtain the second index IY (namely 90 in FIG. 4) of the second feature point 60.

(32) A first index corresponding to the third feature point and a first feature parameter vector corresponding to the first index are determined according to the second index of the second feature point matched with the position of the third feature point and the bidirectional index corresponding relationship; and In an embodiment, the first index IX (namely 100 in FIG. 4) corresponding to the third feature point and the first feature parameter vector $X=(x_1, x_2, \ldots, x_{m1})$ corresponding to the first index IX are found according to the second index IY of the second feature point 60 and the bidirectional index corresponding relationship, that is, the first index IX corresponds to the first feature parameter vector $X=(x_1, x_2, \ldots x_{m1})$ of the first feature point 50 on the first two-dimensional spherical feature surface.

(33) The target knowledge unit of the target medium corresponding to the third feature parameter vector of the to-be-converted medium is determined according to the first feature parameter vector corresponding to the first index.

The target knowledge unit obtained in step (33) is a first knowledge unit, and following the embodiment shown in FIG. 4, the target knowledge unit obtained in step (33) is a semantic illustration (200 in FIG. 4) indicating "right leg forward walking".

Through step (31)-step (33), mapping of the second knowledge unit corresponding to $Y=(y_1, y_2, y_{m2})$ to the first knowledge unit corresponding to $X=(x_1, x_2, \ldots x_{m1})$ is completed.

Similarly, for another example, when the to-be-converted medium is the first medium, and the target medium is the second medium, the implementation process of S503 may include the following steps:

(41) A first index of a first feature point matched with a position of the third feature point is determined.

(42) A second index corresponding to the third feature point and a second feature parameter vector corresponding to the second index are determined according to the first index of the first feature point matched with the position of the third feature point and the bidirectional index corresponding relationship.

(43) The target knowledge unit of the target medium corresponding to the third feature parameter vector of the to-be-converted medium is determined according to the second feature parameter vector corresponding to the second index.

Through step (41)-step (43), mapping of the first knowledge unit corresponding to $X=(x_1, x_2, \ldots x_{m1})$ to the second knowledge unit corresponding to $Y=(y_1, y_2, y_{m2})$ is completed. This process is similar to the above completion of mapping of the second knowledge unit corresponding to $Y=(y_1, y_2, y_{m2})$ to the first knowledge unit corresponding to $X=(x_1, x_2, \ldots x_{m1})$ through step (31)-step (33), which will not be repeated.

Corresponding to the above embodiments of the cross-media corresponding knowledge generation method, the present disclosure further provides an embodiment of a cross-media corresponding knowledge generation apparatus.

Figure 6:
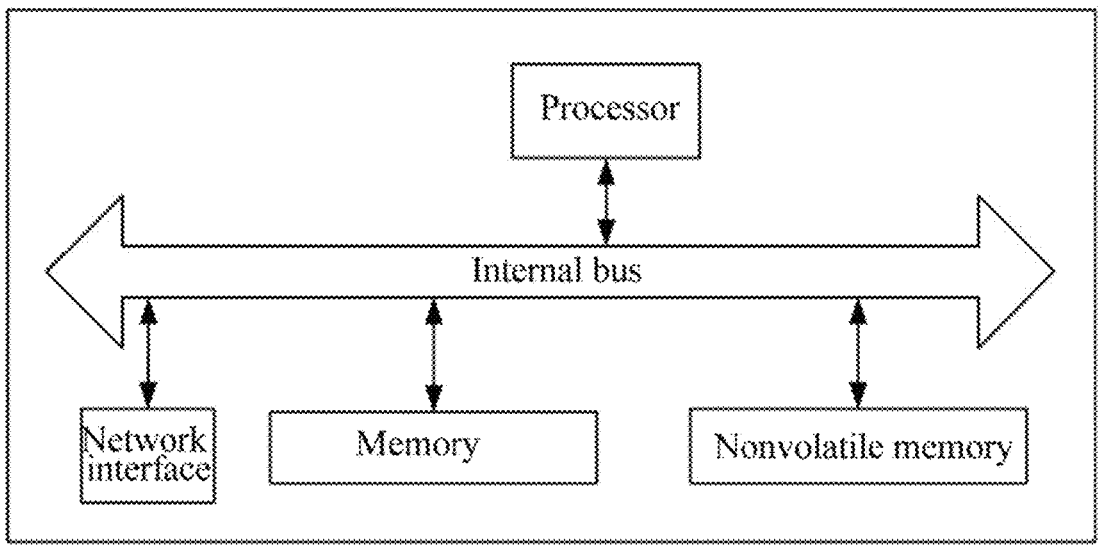
FIG. 6 is a structural block diagram of a cross-media corresponding knowledge generation apparatus in an embodiment of the present disclosure.

Referring to FIG. 6, an embodiment of the present disclosure provides a multi-media corresponding knowledge generation apparatus, including a memory and one or more processors, the memory stores an executable code, and the one or more processors, when executing the executable code, are configured to implement the multi-media corresponding knowledge generation method in the above embodiments.

The embodiment of the cross-media corresponding knowledge generation apparatus provided by an embodiment of the present disclosure may be applied to any device with data processing capabilities, which may be devices or apparatuses such as a computer. The apparatus embodiment may be implemented by software, hardware or a combination of the hardware and the software. Taking software implementation as an example, as an apparatus in a logical sense, it is formed by reading corresponding computer program instructions in a nonvolatile memory to an internal memory by a processor of any device with the data processing capabilities. From the hardware level, as shown in FIG. 6, which is a hardware structural diagram of any device with the data processing capabilities where the cross-media corresponding knowledge generation apparatus is located according to an embodiment of the present disclosure, in addition to a processor, an internal memory, a network interface and a nonvolatile memory shown in FIG. 6, any device with the data processing capabilities where the apparatus is located in the embodiment may usually further include other hardware according to an actual function of the device with the data processing capabilities, which will not be repeated.

The implementation process of functions and effects of all units in the above apparatus specifically refers to the implementation process of corresponding steps in the above method, which will not be repeated here.

As for the apparatus embodiments, since it basically corresponds to the method embodiments, please refer to the partial description of the method embodiments for the relevant parts. The apparatus embodiments described above are merely illustrative. The units described as separate components may or may not be physically separated, and the components displayed as units may or may not be physical unit, that is, they may be located in one place, or may be distributed to multiple network units. Some or all of the modules may be selected according to actual needs to realize the purpose of the solution of present disclosure. Those of ordinary skill in the art may understand and implement it without creative labor.

An embodiment of the present disclosure further provides a computer readable storage medium, storing a program, and the program, when executed by a processor, implements the cross-media corresponding knowledge generation method in the above embodiments.

The above computer-readable storage medium may be an internal storage unit of any device with the data processing capabilities described in any one of the above embodiments, such as a hard disk or an internal memory. The computer-readable storage medium may also be an external storage device of any device with the data processing capabilities, such as a plug-in hard disk, a smart media card (SMC), an SD card and a flash card, provided on the device. Further, the computer-readable storage medium may further include both the internal storage unit of any device with the data processing capabilities and the external storage device. The computer-readable storage medium is configured to store the computer program and other programs and data required by any device with the data processing capabilities, and may further be configured to temporarily store data that has been or will be outputted.

The foregoing descriptions are only preferred embodiments of the present disclosure and are not used to limit the present disclosure. For those skilled in the art, the present disclosure can have various modifications and changes. Any modification, equivalent replacement, improvement, etc. made within the spirit and principle of the present disclosure should be included in the protection scope of the present disclosure.

What is claimed is:

1. A cross-media corresponding knowledge generation method, comprising the following steps:
   Generating a second knowledge unit of a second medium according to a first knowledge unit of a predefined first medium, wherein types of the first medium and the second medium are different from each other, and the first knowledge unit and the second knowledge unit are configured to represent semantics of feature information of a same target object in a media corresponding to the types of the first medium and the second medium, respectively;
   Generating a first feature parameter vector corresponding to the first knowledge unit and a second feature parameter vector corresponding to the second knowledge unit;
   mapping the first feature parameter vector and the second feature parameter vector to two-dimensional spherical feature surfaces corresponding to the first feature parameter vector and the second feature parameter, respectively, according to a preset mapping relationship, to obtain a first feature point of the first feature parameter vector on a two-dimensional spherical feature surface corresponding to the first feature parameter vector and a second feature point of the second feature parameter vector on a two-dimensional spherical feature surface corresponding to the second feature parameter vector;
   indexing the first feature point and the second feature point, respectively, to obtain a first index corresponding to the first feature point and a second index corresponding to the second feature point; and
   generating a bidirectional index corresponding relationship between the first knowledge unit and the second knowledge unit according to the first index and the second index;
   acquiring a third feature parameter vector of a to-be-converted medium;
   mapping the third feature parameter vector to the two-dimensional spherical feature surface according to the mapping relationship to obtain a third feature point;
   mapping cross-media corresponding knowledge according to the third feature point and the bidirectional index corresponding relationship, and mapping the to-be-converted medium to a target medium to obtain a target knowledge unit, expressing cross-media corresponding knowledge between the first knowledge unit and the second knowledge unit, so that the cross-media corresponding knowledge is capable of being directly configured to map between subsequent cross-media knowledge units;
   wherein the to-be-converted medium is one of the first medium and the second medium, and the target medium is the other one of the first medium and the second medium; and
   wherein when the to-be-converted medium is the first medium, and the target medium is the second medium, the target knowledge unit is the second knowledge unit; and when the to-be-converted medium is the second medium, and the target medium is the first medium, the target knowledge unit is the first knowledge unit.

2. The cross-media corresponding knowledge generation method according to claim 1, comprising a plurality of first knowledge units, wherein the plurality of first knowledge units correspondingly represent semantics of different feature information of the same target object, and the second knowledge units are in one-to-one correspondence with the first knowledge units; and
   wherein said generating the first feature parameter vector corresponding to the first knowledge unit and the second feature parameter vector corresponding to the second knowledge unit comprises:
   generating first feature parameter vectors corresponding to all first knowledge units, respectively, and second feature parameter vectors corresponding to all second knowledge units, respectively;
   wherein positions of feature points of different first feature parameter vectors mapped to two-dimensional spherical feature surfaces corresponding to different first feature parameter vectors are different from each other, and positions of feature points of different second feature parameter vectors mapped to two-dimensional spherical feature surfaces corresponding to different second feature parameter vectors are different from each other.

3. The cross-media corresponding knowledge generation method according to claim 2, further comprising, subsequent to mapping the first feature parameter vector and the second feature parameter vector to two-dimensional spherical feature surfaces corresponding to the first feature parameter vector and the second feature parameter, respectively, according to a preset mapping relationship, to obtain a first feature point of the first feature parameter vector on a two-dimensional spherical feature surface corresponding to the first feature parameter vector and a second feature point of the second feature parameter vector on a two-dimensional spherical feature surface corresponding to the second feature parameter vector, and prior to indexing the first feature point and the second feature point, respectively, to obtain a first index corresponding to the first feature point and a second index corresponding to the second feature point:

taking a respective first feature point as a first central feature point for the respective first feature point, and updating a first feature parameter vector of the first central feature point according to first feature parameter vectors of the first feature points around the first central feature point;

taking a respective second feature point as a second central feature point for the respective second feature point, and updating a second feature parameter vector of the second central feature point according to the second feature parameter vectors of the second feature points around the second central feature point;

wherein said indexing the first feature point and the second feature point, respectively, to obtain a first index corresponding to the first feature point and a second index corresponding to the second feature point comprises:

indexing first feature points after updating feature parameter vectors and second feature points after updating feature parameter vectors, respectively, to obtain first indexes corresponding to the first feature points after updating the feature parameter vectors and second indexes corresponding to the second feature points after updating the feature parameter vectors.

4. The cross-media corresponding knowledge generation method according to claim 3, wherein said updating the first feature parameter vector of the first central feature point according to the first feature parameter vectors of the first feature points around the first central feature point comprises:

determining a first weight of each of the first feature points around the first central feature point; and determining the first feature parameter vector of the first central feature point again according to the first weights, the first feature parameter vectors of the first feature points corresponding to the first weights and the first feature parameter vector of the first central feature point.

5. The cross-media corresponding knowledge generation method according to claim 4, wherein the first weights are negatively correlated with first distances, and the first distances are distances from the first central feature point to corresponding first feature points around the first central feature point.

6. The cross-media corresponding knowledge generation method according to claim 5, wherein the first weights are determined based on a Gauss equation and the first distances.

7. The cross-media corresponding knowledge generation method according to claim 4, wherein the first feature points around the first central feature point and the first central feature point are located in a same feature domain, the feature domain takes the first central feature point as a center, the first feature points around the first central feature point surround the first central feature point, and the first feature points around the first central feature point are adjacent to a position of the first central feature point; and/or the first feature points around the first central feature point comprise: a first feature point with a first feature parameter vector, a difference between which s and the first feature parameter vectors corresponding to the first feature points after updating the feature parameter vectors has a modulus smaller than a first preset threshold among the first feature points other than the first central feature point.

8. The cross-media corresponding knowledge generation method according to claim 3, wherein said updating the second feature parameter vector of the second central feature point according to the second feature parameter vectors of the second feature points around the second central feature point comprises:

determining a second weight of each of the second feature points around the second central feature point; and determining the second feature parameter vector of the second central feature point again according to the second weights, the second feature parameter vectors of the second feature points corresponding to the second weights and the second feature parameter vector of the second central feature point.

9. The cross-media corresponding knowledge generation method according to claim 8, wherein the second weights are negatively correlated with second distances, and the second distances are distances from the second central feature point to corresponding second feature points around the second central feature point.

10. The cross-media corresponding knowledge generation method according to claim 9, wherein the second weights are determined based on a Gauss equation and the second distances.

11. The cross-media corresponding knowledge generation method according to claim 8, wherein the second feature points around the second central feature point and the second central feature point are located in the same feature domain, the feature domain takes the second central feature point as a center, the second feature points around the second central feature point surround the second central feature point, and the second feature points around the second central feature point are adjacent to a position of the second central feature point; and/or the second feature points around the second central feature point comprise: a second feature points with a second feature parameter vector, a difference between which and the second feature parameter vectors corresponding to the second feature points after updating the feature parameter vectors has a modulus smaller than a second preset threshold among the second feature points other than the second central feature point.

12. The cross-media corresponding knowledge generation method according to claim 1, wherein prior to said generating the second knowledge unit of the second medium according to the first knowledge unit of the predefined first medium, the method further comprises: defining the first knowledge unit of the first medium according to manual or automatic text generation; and/or wherein the first feature parameter vectors are feature parameter vectors in a BVH format; and/or wherein the second feature parameter vectors are differential parameter vectors of a boundary point.

13. The cross-media corresponding knowledge generation method according to claim 1, wherein when the to-be-converted medium is the first medium, and the target medium is the second medium, said mapping the cross-media corresponding knowledge according to the third feature point and the bidirectional index corresponding relationship, and mapping the to-be-converted medium to the target medium to obtain the target knowledge unit comprise:

determining a first index of a first feature point matched with a position of the third feature point;

determining a second index corresponding to the third feature point and a second feature parameter vector corresponding to the second index according to the first index of the first feature point matched with the position of the third feature point and the bidirectional index corresponding relationship; and determining the target knowledge unit of the target medium corresponding to the third feature parameter vector of the to-be-converted medium according to the second feature parameter vector corresponding to the second index.

14. A cross-media corresponding knowledge generation apparatus, comprising a memory and one or more processors, wherein the memory stores an executable code, and the one or more processors, when executing the executable code, are configured to implement the cross-media corresponding knowledge generation method according to claim 1.

15. A non-transitory computer readable storage medium storing a program thereon, wherein the program, when executed by a processor, implements the cross-media corresponding knowledge generation method according to claim 1.

* * * * *